United States Patent
Uenishi et al.

(10) Patent No.: US 6,808,687 B1
(45) Date of Patent: Oct. 26, 2004

(54) CATALYTIC CONVERTER FOR CLEANING EXHAUST GAS

(75) Inventors: Mari Uenishi, Osaka (JP); Isao Tan, Osaka (JP); Hirohisa Tanaka, Osaka (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 09/577,080

(22) Filed: May 23, 2000

(30) Foreign Application Priority Data

| May 24, 1999 | (JP) | 11-143624 |
| Apr. 28, 2000 | (JP) | 2000-128799 |

(51) Int. Cl.⁷ .......... B01J 21/04; B01J 21/06; B01D 53/34
(52) U.S. Cl. .......... 422/177; 422/180; 502/304
(58) Field of Search .......... 422/171, 177, 422/180; 502/439, 302, 304

(56) References Cited

U.S. PATENT DOCUMENTS

| 4,927,799 A | 5/1990 | Matsumoto et al. |
| 5,015,617 A | 5/1991 | Ohata et al. |
| 5,063,192 A | 11/1991 | Murakami |
| 5,075,276 A | 12/1991 | Ozawa |
| 5,147,842 A | 9/1992 | Funabiki |
| 5,200,384 A | 4/1993 | Funabiki |
| 5,248,650 A | 9/1993 | Sekiba |
| 5,260,249 A | 11/1993 | Shiraishi |
| 5,490,977 A | 2/1996 | Wan |
| 5,681,788 A | 10/1997 | Kanesaka |
| 5,762,894 A | 6/1998 | Takatori |
| 5,837,642 A | 11/1998 | Tanaka et al. |
| 6,261,989 B1 * | 7/2001 | Tanaka et al. .............. 502/217 |

FOREIGN PATENT DOCUMENTS

| DE | 196 44 276 | 7/1997 |
| EP | 0 428 753 A1 | 6/1990 |
| EP | 0 566 401 | 4/1993 |
| EP | 0 637 461 A1 | 8/1993 |
| EP | 00 708 066 | 4/1996 |
| EP | 0 778 071 A1 | 12/1996 |
| JP | 7-080311 | 3/1995 |

* cited by examiner

Primary Examiner—Hien Tran
(74) Attorney, Agent, or Firm—Merchant & Gould P.C.

(57) ABSTRACT

A catalytic converter for cleaning exhaust gas includes a first coating layer formed on a heat-resistant support, and a second coating layer formed on the first coating layer. The first coating layer contains alumina which supports palladium. The second coating layer contains Ce—Zr complex oxide which coexistently carries platinum and rhodium, and Zr—Ce complex oxide which differs in composition from the Ce—Zr complex oxide and which coexistently carries platinum and rhodium.

10 Claims, 1 Drawing Sheet

CATALYTIC CONVERTER FOR CLEANING EXHAUST GAS

TECHNICAL FIELD

The present invention relates to a catalytic converter for cleaning the exhaust gas of an internal combustion engine of a car. More specifically, the present invention relates to a catalytic converter for effectively removing nitrogen oxide ($NO_x$), carbon monoxide (CO) and hydrocarbons (HC) contained in such exhaust gas.

BACKGROUND ART

Conventionally, a so-called three-way catalytic converter has been used for removing the harmful substances ($NO_x$, CO, HC and the like) from exhaust gas. The three-way catalytic converter utilizes, as an active substance, a precious metal or metals such as platinum, palladium and/or rhodium. This three-way catalytic converter works as a reduction catalyst for reducing $NO_x$ to $N_2$ while also working as an oxidation catalyst for oxidizing CO and HC to $CO_2$ and $H_2O$. In this way, the three-way catalytic converter is capable of cleaning exhaust gas by removal of the harmful substances such as $NO_x$, CO and HC.

In recent years, various researches have been made to improve the performance of a three-way catalytic converter. An example of the three-way catalytic converters which have resulted from such researches utilizes cerium oxide ($CeO_2$) provided coexistently with a three-way catalyst. $CeO_2$ has an oxygen-storing capacity (OSC). The OSC is the ability to occlude excess oxygen in an oxygen-excessive atmosphere and to release the occluded oxygen in an oxygen-deficient atmosphere. In an oxygen-excessive atmosphere, for example, reducing reaction occurs reluctantly. In the presence of $CeO_2$, it occludes the excess oxygen to reduce the concentration of oxygen. Thus, when exhaust gas having a high oxygen concentration is supplied to the exhaust gas cleaning catalytic converter, $CeO_2$ occludes oxygen to lower the oxygen concentration of the exhaust gas, thereby enabling the three-way catalyst to effectively perform reducing reaction. Conversely, when exhaust gas having a low oxygen concentration is supplied to the exhaust gas cleaning catalytic converter, $CeO_2$ releases oxygen to increase the oxygen concentration of the exhaust gas, thereby enabling the three-way catalyst to effectively perform oxidation.

In cars, there is an increasing demand for dealing with higher restrictions on cold emissions, so that the exhaust gas cleaning catalytic converter is required to effectively clean exhaust gas even at relatively low temperature when the engine is not sufficiently warmed up immediately after its start for example. Thus, the catalytic converter needs to have high catalytic activity at low temperature. For this purpose, the engine tends to be located at the exhaust manifold which is near the engine rather than below the body floor. Due to the location at the manifold, the catalytic converter may be often exposed to high temperature of no less than 900° C. (or sometimes no less than 1,000° C.). Thus, the catalytic converter needs to provide high durability at such a high temperature.

It is, therefore, an object of the present invention to provide a catalytic converter for cleaning exhaust gas which is capable of providing good catalytic activity at low temperature while also providing high resistance against high temperature.

DISCLOSURE OF THE INVENTION

According to the present invention, a catalytic converter for cleaning exhaust gas comprises a first coating layer formed on a heat-resistant support, and a second coating layer formed on the first coating layer. The first coating layer contains alumina which supports palladium. The second coating layer contains Ce—Zr complex oxide which coexistently carries platinum and rhodium, and Zr—Ce complex oxide which differs in composition from the Ce—Zr complex oxide and which coexistently carries platinum and rhodium.

In a preferred embodiment of the present invention, the Ce—Zr complex oxide may be represented by the following general formula.

$$Ce_{1-(x+y)}Zr_xM_yO_{2-z} \qquad (1)$$

In the formula (1), M represents a rare earth element other than Ce and Zr or an alkaline earth metal. z represents the degree of oxygen deficiency determined by the valence and proportion of the contained element M. Further, $0.25 \leq 1-(x+y) \leq 1.0$, $0 \leq x \leq 0.55$, and $0 \leq y \leq 0.2$.

The Zr—Ce complex oxide may be represented by the following general formula.

$$Zr_{1-(a-b)}Ce_aN_bO_{2-c} \qquad (2)$$

In the formula (2), N represents a rare earth element other than Ce and Zr or an alkaline earth metal. c represents the degree of oxygen deficiency determined by the valence and proportion of the contained element N. Further, $0.55 \leq 1-(a+b) \leq 1.0$, $0 \leq a \leq 0.45$, and $0 \leq b \leq 0.2$.

In a preferred embodiment of the present invention, the second coating layer has a surface layer portion which coexistently carries platinum and rhodium.

In a preferred embodiment of the present invention, the second coating layer has a surface layer portion which carries one of platinum and rhodium alone.

In a preferred embodiment of the present invention, the first coating layer additionally contains barium salt of an inorganic acid.

In a preferred embodiment of the present invention, the first coating layer supports 30~100 g of alumina and 0.5~8.0 g of palladium per liter of the heat-resistant support.

In a preferred embodiment of the present invention, the Ce—Zr complex oxide carries a total amount of 0.3~3.0 g of platinum and rhodium per liter of the heat-resistant support, whereas the Zr—Ce complex oxide carries a total amount of 1.0~3.0 g of platinum and rhodium per liter of the heat-resistant support.

In a preferred embodiment of the present invention, the surface layer portion of the second coating layer carries a total amount of 0.05~2.0 g of platinum and rhodium per liter of the heat-resistant support.

In a preferred embodiment of the present invention, the first coating layer additionally contains Ce—Zr complex oxide which does not carry any precious metal.

In a preferred embodiment of the present invention, the second coating layer additionally contains alumina which does not support any precious metal.

BEST MODE FOR CARRYING OUT THE INVENTION

Figure 1:
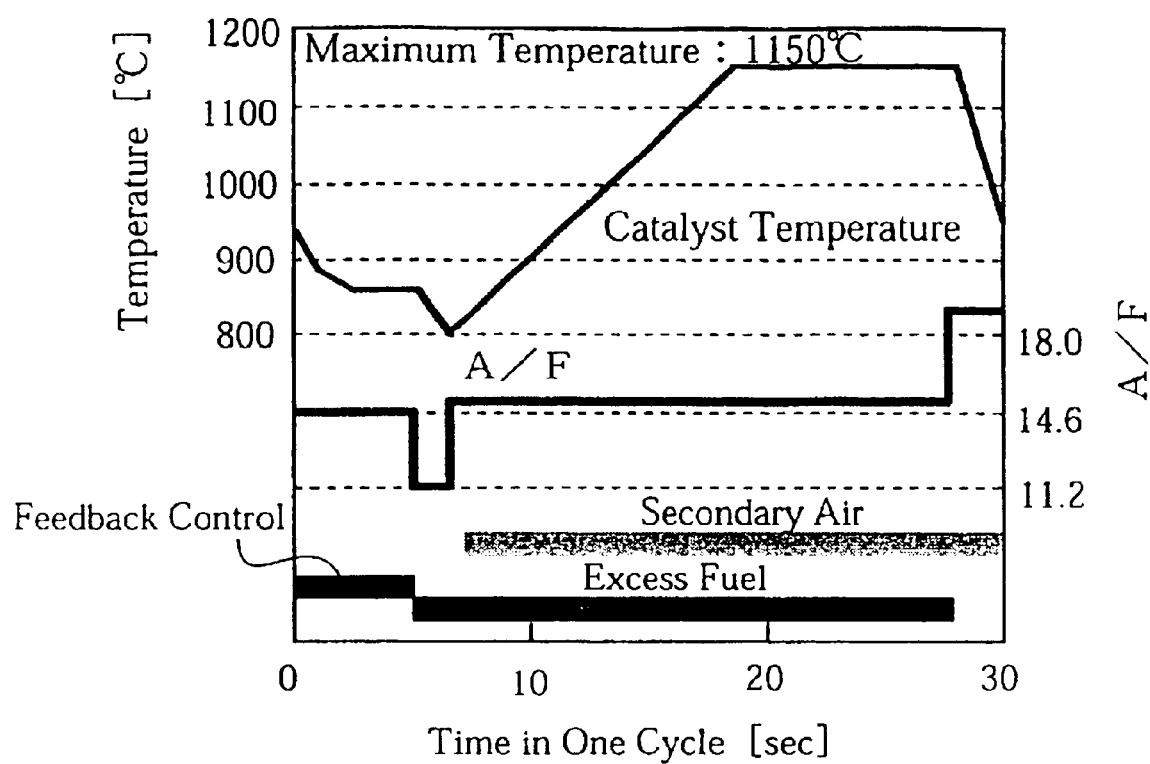
FIG. 1 is a view showing the results of durability tests performed both for examples of the present invention and comparative examples.

An exhaust gas cleaning catalytic converter according to the present invention comprises a first coating layer formed on a heat-resistant support, and a second coating layer formed on the first coating layer.

The first coating layer contains alumina ($Al_2O_3$) which supports palladium (Pd).

The second coating layer contains Ce—Zr complex oxide which coexistently carries platinum (Pt) and rhodium (Rh), and Zr—Ce complex oxide which differs in composition from the Ce—Zr complex oxide and which coexistently carries Pt and Rh.

The first coating layer of the catalytic converter contains Pd as supported on $Al_2O_3$. Since Pd provides a good catalytic activity at low temperature, the catalytic converter is capable of effectively cleaning exhaust gas at low temperature by removal of HC in particular. Since alumina provides excellent heat resistance, Pd supported on $Al_2O_3$ remains stable at high temperature. Further inclusion of Pd in the first coating layer which is formed inside the second coating layer prevents Pd from being adversely affected by poisoning substances contained in the exhaust gas.

In this way, since the catalytic converter provides good catalytic activity at low temperature, it is capable of sufficiently cleaning exhaust gas containing HC and the like even before the engine is sufficiently warmed up.

In the exhaust gas cleaning catalytic converter, the Ce—Zr complex oxide and the Zr—Ce complex oxide are contained in the second coating layer. Each of the Ce—Zr complex oxide and the Zr—Ce complex oxide is a support which is thermally stable and provides high OSC. Pt and Rh are coexistently carried on each of the Ce—Zr complex oxide and the Zr—Ce complex oxide. Pt and Rh exhibit relatively high catalytic activity at high temperature. Thus, the catalytic converter provides high thermal stability while exhibiting high catalytic activity for high-temperature exhaust gas.

In the exhaust gas cleaning catalytic converter, Pt and Rh are coexistently carried on a common support. This is because Pt and Rh are compatible with each other. By contrast, Pd exists in the first coating layer and is carried on a support which is different from that used for carrying Rh and Pt. This is because Pd and Rh alloys easily with each other at high temperature to result in loss of their respective catalytic properties.

The heat-resistant support usable in the present invention may be made of cordierite, mullite, α-alumina or a metal (e.g. stainless steel) and may have a honeycomb structure having a multiplicity of cells.

The amounts of $Al_2O_3$ and Pd contained in the first coating layer are preferably 30~100 g and 0.5~8.0 g, respectively, per liter (apparent volume) of the heat-resistant support (hereafter represented as "g/l-cat"). A more preferable range for the Pd amount is 0.5~2.0 g.

The first coating layer of the exhaust gas cleaning catalytic converter according to the present invention may additionally contain barium salt of an inorganic acid. The addition of the Ba salt effectively restricts deterioration in catalytic activity of Pd.

Examples of Ba salts of inorganic acids usable for the present invention include barium sulfate ($BaSO_4$) and barium nitrate ($BaNO_3$).

In the exhaust gas cleaning catalytic converter of the present invention, the first coating layer may additionally contain a heat-resistant inorganic oxide which does not support any precious metal. Examples of heat-resistant inorganic oxide usable for the present invention include $Al_2O_3$, $CeO_2$, Ce—Zr complex oxide, $ZrO_2$, Zr—Ce complex oxide, $SiO_2$, $TiO_2$ and MgO. The most preferable among the enumerated candidates of heat-resistant inorganic oxide is Ce—Zr complex oxide. The amount of the heat-resistant inorganic oxide contained in the first coating layer may be normally 0~60 g/l-cat.

The Ce—Zr complex oxide contained in the second coating layer may be represented by the following general formula.

$$Ce_{1-(x+y)}Zr_xM_yO_{2-z}$$

In this formula, M represents a rare earth element (excluding Ce and Zr) or an alkaline earth metal. z represents the degree of oxygen deficiency determined by the valence and proportion of the element M. The proportion of Ce in the Ce—Zr complex oxide should be preferably $0.25 \leq 1-(x+y) \leq 1.0$. The proportion of Zr should be preferably $0 \leq x \leq 0.55$. The proportion of M should be preferably $0 \leq y \leq 0.2$. The proportion of Ce and Zr in the Ce—Zr complex oxide should be more preferably $0.35 \leq 1-(x+y) \leq 0.55$ and $0.4 \leq x \leq 0.55$, respectively.

The Zr—Ce complex oxide may be represented by the following general formula.

$$Zr_{1-(a+b)}Ce_aN_bO_{2-c}$$

In the above formula, N represents a rare earth element (excluding Ce and Zr) or an alkaline earth metal. c represents the degree of oxygen deficiency determined by the valence and proportion of the element N. Further, the proportion of Zr in the Zr—Ce complex oxide should be preferably $0.55 \leq 1-(a+b) \leq 1.0$. The proportion of Ce should be preferably $0 \leq a \leq 0.45$. The proportion of N should be preferably $0 \leq b \leq 0.2$. The proportion of Zr and Ce in the Ce—Zr complex oxide should be more preferably $0.55 \leq 1-(a+b) \leq 0.85$ and $0.15 \leq a \leq 0.20$, respectively.

Examples of rare earth elements other than Ce and Zr usable for the respective complex oxide include Pr, Tb, Nd, Y and La. Examples of alkaline earth metals include Mg and Ca.

The Ce—Zr complex oxide and the Zr—Ce complex oxide contain $CeO_2$ and $ZrO_2$. In each of these complex oxides, part of the Ce element of the $CeO_2$ crystal is preferably substituted by Zr in solid solution, and part of the Zr element of the $ZrO_2$ crystal is preferably substituted by Ce in solid solution. Such substitution structure restrains grain growth (sintering) of $CeO_2$ and $ZrO_2$ to improve heat resistance. Similarly, the addition of the rare earth element (excluding Ce and Zr) or alkaline earth element to the Ce—Zr complex oxide and the Zr—Ce complex oxide also enhances heat resistance.

The Ce—Zr complex oxide may preferably carry a total amount of 0.3~3.0 g/l-cat, more preferably 0.8~2.0 g/l-cat, of Pt and Rh. The Zr—Ce complex oxide may preferably carry a total amount of 1.0~3.0 g/l-cat, more preferably 1.0~2.5 g/l-cat, of Pt and Rh.

In the exhaust gas cleaning catalytic converter of the present invention, the second coating layer may additionally contain alumina which does not support any precious metal. Examples of heat-resistant inorganic oxide usable for the present invention include $Al_2O_3$, $CeO_2$, Ce—Zr complex oxide, $ZrO_2$, Zr—Ce complex oxide, $SiO_2$, TiO, and MgO. The most preferable among the enumerated candidates of heat-resistant inorganic oxide is $Al_2O_3$. The amount of the heat-resistant inorganic oxide contained in the second coating layer may be normally 0~80 g/l-cat.

In the exhaust gas cleaning catalytic converter of the present invention, the surface layer portion of the second coating layer may carry at least one of Pt and Rh. Pt and Rh may be supported on the surface portion of the second coating either alone or coexistently. The total amount of Pt and Rh supported on the surface portion of the second coating may be normally 0.05~2.0 g/l-cat, preferably 0.05~1.0 g/l-cat.

The exhaust gas cleaning catalytic converter, in which Pt and/or Rh are supported on the surface portion of the second coating layer, is capable of cleaning the exhaust gas with high response. More particularly, it is capable of effectively cleaning the exhaust gas discharged even immediately after start of the engine.

The exhaust gas cleaning catalytic converter according to the present invention may be manufactured in the following manner for example.

First, a first coating layer is formed on a heat-resistant support.

The first coating layer may be formed by preparing a predetermined slurry, then coating the slurry over the heat-resistant support (e.g. the inner cell surfaces of a cordierite honeycomb support), and then heat-treating the support at 300° C. for 3 hours in an electric oven for example.

The slurry may be prepared by adding a predetermined amount of water to Pd-supporting $Al_2O_3$ optionally mixed with Ba salt of an inorganic acid (e.g. $BaSO_4$) and heat-resistant inorganic oxide (e.g. Ce—Zr complex oxide) not supporting any precious metal, and then crushing the mixture in a ball mill.

Pd may be supported on $Al_2O_3$ by preparing a solution containing a salt of Pd, then impregnating $Al_2O_3$ with the salt-containing solution, and thereafter heat-treating $Al_2O_3$. Examples of Pd-salt solutions include nitrate and chloride. The Pd-salt solution may contain about 1~20 wt % of Pd salt. The heat-treatment of $Al_2O_3$ impregnated with Pd salt may include heating first at about 50~200° C. for about 1~48 hours and thereafter baking at about 350~1,000° C. (preferably about 400~800° C.) for about 1~12 hours (preferably about 2~4 hours).

Next, a second coating is formed over the first coating.

The second coating layer may be formed by preparing a predetermined slurry, then coating the slurry over the first coating, and then heat-treating the second coating at 300° C. for 3 hours in an electric oven for example.

The slurry may be prepared by adding a predetermined amount of water to Pt- & Rh-supporting Ce—Zr complex oxide and Zr—Ce complex oxide optionally mixed with heat-resistant inorganic oxide (e.g. $Al_2O_3$) not supporting any precious metal, and then crushing the mixture in a ball mill.

Each of the Ce—Zr complex oxide and the Zr—Ce complex oxide may be prepared to have a desired composition by using known techniques (e.g. coprecipitation process or alkoxide process).

The coprecipitation process for the complex oxide includes preparing a solution which contains respective salts of Ce, Zr and optionally rare earth element (excluding Ce and Zr) and/or alkaline earth metal in a predetermined stoichiometric ratio. Then, an aqueous alkaline solution is added to the salt solution for causing the respective salts of Ce, Zr and optionally rare earth element (excluding Ce and Zr) and/or alkaline earth metal to coprecipitate. Thereafter, the resulting coprecipitate is heat-treated to provide a target complex oxide.

Examples of salts of rare earth elements (including cerium and zirconium) and alkaline earth metals include inorganic salts such as sulfates, oxysulfate, nitrates, oxynitrate, chlorides, oxychloride, hydrochlorides and phosphates, as well as organic salts such as acetates, oxyacetate and oxalates.

Examples of aqueous alkaline solutions for coprecipitation include an aqueous solution of ammonia, an aqueous solution of ammonium carbonate and an aqueous solution of sodium hydroxide.

The alkoxide process includes preparing an alkoxide mixture solution which contains Ce, Zr, optionally rare earth element (other than Ce and Zr) and/or alkaline earth metal. Then, deionized water is added to the alkoxide mixture solution for causing hydrolysis. Thereafter, the resulting hydrolysate is heat-treated to provide a target complex oxide.

Examples of alkoxides usable for preparing the alkoxide mixture solution include methoxides, ethoxides, propoxides and butoxides. Instead, ethylene oxide addition salts of these are also usable.

It should be understood that the source of Zr may contain 1~3% of Hf, as is normally the case with industrial application. In this case, the composition is calculated by regarding the Hf content as Zr.

The heat treatment of the coprecipitate or the hydrolysate includes drying the coprecipitate or the hydrolysate at about 50~200° C. for about 1~48 hours after filtration and washing, and baking the coprecipitate or the hydrolysate at about 350~1,000° C., preferably about 400~800° C., for about 1~12 hours.

Pt and Rh may be supported on the Ce—Zr complex oxide and the Zr—Ce complex oxide substantially in the same manner as Pd is supported on $Al_2O_3$. Specifically, a solution is prepared which contains respective salts of Pt and Rh, and the complex oxide is impregnated with the salt solution and then heat-treated. The conditions for the heat treatment may be similar to the case where Pd is supported on $Al_2O_3$.

The exhaust gas cleaning catalytic converter of the present invention may be produced in this manner. Optionally, Pt and Rh may be supported on the surface portion of the second coating layer. For supporting Pt and Rh on the surface portion of the second coating layer, a solution containing respective salts of Pt and Rh is prepared and sprayed over the second coating layer, whereupon the second coating layer is heat-treated. The heat treatment may be performed at 600° C. for 3 hours in an electric oven for example.

Next, the present invention will be specifically described with reference to embodiments and comparative examples. However, the technical scope of the present invention will not be limited in any way by these embodiments.

[Embodiment 1]

In this embodiment, an exhaust gas cleaning catalytic converter (1) was made by forming a first coating layer on the inner cell surfaces of a cordierite honeycomb support and then forming a second coating layer over the first coating layer.

The first coating layer was formed by preparing a slurry, then coating the slurry on the honeycomb support, and then baking the support at 300° C. for 3 hours in an electric oven.

The slurry was prepared by mixing and crushing Pd-supporting $Al_2O_3$ and $BaSO_4$ in a ball mill. Pd-supporting $Al_2O_3$ was prepared by impregnating $Al_2O_3$ with an aqueous solution of palladium nitrate to have a Pd content of 2.1 wt %, and baking it at 300° C. for 3 hours in an electric oven after drying.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (a) of CZY① as an example of Ce—Zr complex oxide, Pt- & Rh-supporting powder (b) of ZCLN as an example of Zr—Ce complex oxide, activated alumina and alumina sol in a ball mill. The powder (a) was prepared by successively impregnating CZY① having a composition of $Ce_{0.45}Zr_{0.48}Y_{0.7}O_{1.96}$ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZY① was selected to provide a Pt content of 1.1 wt % and a Rh content of 0.4 wt %.

The powder (b) was prepared by successively impregnating ZCLN having a composition of $Zr_{0.78}Ce_{0.16}La_{0.02}Nd_{0.04}O_{1.97}$ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on ZCLN was selected to provide a Pt content of 1.5 wt % and a Rh content of 2.0 wt %.

In the exhaust gas cleaning catalytic converter (1), the first coating layer contained, per liter of the honeycomb support, 1.5 g of Pd, 70 g of $Al_2O_3$ and 20 g of $BaSO_4$, whereas the second coating layer, per liter of the honeycomb support, contained 1.75 g of Pt, 1.4 g of Rh, 90 g of CZY①, 50 g of ZCLN and 50 g of $Al_2O_3$.

[Embodiment 2]

In this embodiment, an exhaust gas cleaning catalytic converter (2) was made by forming a first coating layer on the inner cell surfaces of a cordierite honeycomb support and then forming a second coating layer over the first coating layer.

The first coating layer was formed by preparing a slurry, then coating the slurry on the honeycomb support, and then baking the support at 300° C. for 3 hours in an electric oven.

The slurry was prepared by mixing and crushing Pd-supporting $Al_2O_3$, $BaSO_4$, and CZY② in a ball mill. Pd-supporting $Al_2O_3$ was prepared by impregnating $Al_2O_3$ with an aqueous solution of palladium nitrate to have a Pd content of 3.0 wt %, and baking it at 300° C. for 3 hours in an electric oven after drying. CZY② was Ce—Zr complex oxide having a composition of $Ce_{0.5}Zr_{0.45}Y_{0.05}O_{1.97}$.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (c) of CZY② as another example of Ce—Zr complex oxide, Pt- & Rh-supporting powder (d) of ZCL as another example of Zr—Ce complex oxide, activated alumina and alumina sol in a ball mill.

The powder (c) was prepared by successively impregnating CZY② with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZY② was selected to provide a Pt content of 1.0 wt % and a Rh content of 0.4 wt %.

The powder (d) was prepared by successively impregnating ZCL having a composition of $Zr_{0.8}Ce_{0.16}La_{0.04}O_{1.98}$ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on ZCL was selected to provide a Pt content of 1.5 wt % and a Rh content of 2.0 wt %.

In the exhaust gas cleaning catalytic converter (2), the first coating layer contained, per liter of the honeycomb support, 1.5 g of Pd, 50 g of $Al_2O_3$, 45 g of CZY② and 20 g of $BaSO_4$, whereas the second coating layer, per liter of the honeycomb support, contained 1.5 g of Pt, 1.3 g of Rh, 75 g of CZY②, 50 g of ZCL and 55 g of $Al_2O_3$.

[Embodiment 3]

In this embodiment, an exhaust gas cleaning catalytic converter (3) was made by forming a first coating layer on the inner cell surfaces of a cordierite honeycomb support and then forming a second coating layer over the first coating layer.

The first coating layer was formed by preparing a slurry, then coating the slurry on the honeycomb support, and then baking the support at 300° C. for 3 hours in an electric oven.

The slurry was prepared by mixing and crushing Pd-supporting $Al_2O_3$, $BaSO_4$, and CZY③ in a ball mill. Pd-supporting $Al_2O_3$ was prepared by impregnating $Al_2O_3$ with an aqueous solution of palladium nitrate to have a Pd content of 3.0 wt %, and baking it at 300° C. for 3 hours in an electric oven after drying. CZY③ was Ce—Zr complex oxide having a composition of $Ce_{0.39}Zr_{0.53}Y_{0.08}O_{1.96}$.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (e) of CZY③ as a further example of Ce—Zr complex oxide, Pt- & Rh-supporting powder (f) of ZCP as a further example of Zr—Ce complex oxide, activated alumina and alumina sol in a ball mill.

The powder (e) was prepared by successively impregnating CZY③ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZY③ was selected to provide a Pt content of 1.1 wt % and a Rh content of 0.4 wt %.

The powder (f) was prepared by successively impregnating ZCP having a composition of $Zr_{0.64}Ce_{0.19}Pr_{0.17}O_{1.97}$ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on ZCP was selected to provide a Pt content of 1.5 wt % and a Rh content of 2.0 wt %.

In the exhaust gas cleaning catalytic converter (3), the first coating layer contained, per liter of the honeycomb support, 1.5 g of Pd, 50 g of $Al_2O_3$, 10 g of CZY③ and 20 g of $BaSO_4$, whereas the second coating layer, per liter of the honeycomb support, contained 1.75 g of Pt, 1.4 g of Rh, 90 g of CZY③, 50 g of ZCP and 40 g of $Al_2O_3$.

[Embodiment 4]

In this embodiment, an exhaust gas cleaning catalytic converter (4) was made by coexistently supporting Pt and Rh on a surface portion of the second coating of the catalytic converter (2) obtained in Embodiment 2.

Pt and Rh were supported on the surface portion of the second coating by successively impregnating the surface portion with an aqueous solution of dinitro diammineplatinum nitrate and an aqueous solution of rhodium nitrate, and baking the surface portion at 600° C. for 3 hours in an electric oven after drying. The amount of dinitro diammineplatinum nitrate and rhodium nitrate impregnated on the second coating was selected to provide a Pt content of 0.5 g and a Rh content of 0.1 g per liter of the honeycomb support.

The exhaust gas cleaning catalytic converter (4) incorporates all of the components of the catalytic converter (2) and additionally includes 0.5 g of Pt and 0.1 g of Rh on the surface of the second coating layer.

[Embodiment 5]

In this embodiment, an exhaust gas cleaning catalytic converter (5) was made by forming a first coating layer on the inner cell surfaces of a cordierite honeycomb support, then forming a second coating layer over the first coating layer, and then supporting Pt on a surface portion of the second coating.

The first coating layer was formed by preparing a slurry, then coating the slurry on the honeycomb support, and then baking the support at 300° for 3 hours in an electric oven.

The slurry was prepared by mixing and crushing Pd-supporting $Al_2O_3$, $BaSO_4$, and CZY② in a ball mill. Pd-supporting $Al_2O_3$ was prepared by impregnating $Al_2O_3$ with an aqueous solution of palladium nitrate to have a Pd content of 2.6 wt %, and baking it at 300° C. for 3 hours in an electric oven after drying.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (g) of CZY②as an example of Ce—Zr complex oxide, Pt- & Rh-supporting powder (h) of ZCLN as an example of Zr—Ce complex oxide, activated alumina and alumina sol in a ball mill.

The powder (g) was prepared by successively impregnating CZY② with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZY② was selected to provide a Pt content of 1.2 wt % and a Rh content of 0.13 wt %.

The powder (h) was prepared by successively impregnating ZCLN with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on ZCLN was selected to provide a Pt content of 1.8 wt % and a Rh content of 0.6 wt %.

Pt was supported on the surface portion of the second coating by impregnating the surface portion with an aqueous solution of dinitro diammineplatinum nitrate to provide a Pt content of 0.5 g per liter of the honeycomb support, and then baking the surface portion at 600° C. for 3 hours in an electric oven after drying.

In the exhaust gas cleaning catalytic converter (5), the first coating layer contained, per liter of the honeycomb support, 1.3 g of Pd, 50 g of $Al_2O_3$, 45 g of CZY② and 20 g of $BaSO_4$, whereas the second coating layer, per liter of the honeycomb support, contained 1.8 g of Pt, 0.4 g of Rh, 75 g of CZY②, 50 g of ZCLN and 55 g of $Al\,O_3$. The surface portion of the second coating supports 0.2 g of Pt alone per liter of the honeycomb support.

[Embodiment 6]

In this embodiment, an exhaust gas cleaning catalytic converter (6) was made by forming a first coating layer on the inner cell surfaces of a cordierite honeycomb support, then forming a second coating layer over the first coating layer, and then supporting Rh on a surface portion of the second coating.

The first coating layer was formed by preparing a slurry, then coating the slurry on the honeycomb support, and then baking the support at 300° C. for 3 hours in an electric oven.

The slurry was prepared by mixing and crushing Pd-supporting $Al_2O_3$, $BaSO_4$, and CZY② in a ball mill. Pd-supporting $Al_2O_3$ was prepared by impregnating $Al_2O_3$ with an aqueous solution of palladium nitrate to have a Pd content of 2.5 wt %, and baking it at 300° C. for 3 hours in an electric oven after drying.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (i) of CZY②, Pt- & Rh-supporting powder (j) of ZCLN, activated alumina and alumina sol in a ball mill.

The powder (i) was prepared by successively impregnating CZY② with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZY② was selected to provide a Pt content of 1.5 wt % and a Rh content of 0.13 wt %.

The powder (j) was prepared by successively impregnating ZCLN with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on ZCLN was selected to provide a Pt content of 2.0 wt % and a Rh content of 0.4 wt %.

Rh was supported on the surface portion of the second coating by impregnating the surface portion with an aqueous solution of rhodium nitrate to provide a Pt content of 0.1 g per liter of the honeycomb support, and then baking the surface portion at 600° C. for 3 hours in an electric oven after drying.

In the exhaust gas cleaning catalytic converter (6), the first coating layer contained, per liter of the honeycomb support, 1.0 g of Pd, 40 g of $Al_2O_3$, 20 g of CZY② and 20 g of $BaSO_4$, whereas the second coating layer, per liter of the honeycomb support, contained 2.2 g of Pt, 0.3 g of Rh, 80 g of CZY②, 50 g of ZCLN and 60 g of $Al_2O_3$. The surface portion of the second coating supports 0.1 g of Rh alone per liter of the honeycomb support.

[Comparative Example 1]

In this comparative example, an exhaust gas cleaning catalytic converter (7) was made by forming a first coating layer on the inner cell surfaces of a cordierite honeycomb support and then forming a second coating layer over the first coating layer.

The first coating layer was formed by preparing a slurry, then coating the slurry on the honeycomb support, and then baking the support at 300° C. for 3 hours in an electric oven.

The slurry was prepared by mixing and crushing Pd-supporting CZ, $Al_2O_3$ and $BaSO_4$ in a ball mill. Pd-supporting CZ was prepared by impregnating CZ with an aqueous solution of palladium nitrate to have a Pd content of 3.2 wt %, and baking it at 300° C. for 3 hours in an electric oven after drying. CZ represents Ce—Zr complex oxide having a composition of $Ce_{0.8}Zr_{0.2}O_2$.

The second coating layer was formed by preparing a slurry, then coating the slurry on the first coating layer, and then baking the second coating layer at 600° C. for 3 hours in an electric oven.

The slurry was prepared by mixing and crushing Pt- & Rh-supporting powder (k) of CZ, activated alumina and alumina sol in a ball mill.

The powder (k) was prepared by successively impregnating CZ with an aqueous solution of dinitro diammineplatinum nitrate and an aqueous solution of rhodium nitrate, and baking the powder at 600° C. for 3 hours in an electric oven after drying. The amount of dinitro diammineplatinum nitrate and rhodium nitrate impregnated on CZ was selected to provide a Pt content of 2.0 wt % and a Rh content of 1.7 wt %.

In the exhaust gas cleaning catalytic converter (7), the first coating layer contained, per liter of the honeycomb support, 1.5 g of Pd, 45 g of CZ, 50 g of $Al_2O_3$ and 20 g of $BaSO_4$, whereas the second coating layer, per liter of the honeycomb support, contained 1.5 g of Pt, 1.3 g of Rh, 75 g of CZ and 75 g of $Al_2O_3$.

[Performance Evaluation of Catalytic Converters]

The respective catalytic converters (1)~(7) fabricated according to Embodiments 1~6 and Comparative Example 1 were tested for their performance in cleaning exhaust gas after performing the following aging process. Performance evaluation was made by determining the HC-50% removal temperature and the CO-$NO_x$ cross point removal ratio.

(Aging)

In this aging process, each of the catalytic converters was mounted on one bank (4 cylinders) of a 4-liter V8-engine which was actually installed on a car, and the engine exhaust gas was introduced into the converter. Specifically, a cycle (30 seconds) described below with reference to FIG. 1 was repeated 5,760 times for a total period of 48 hours, and the converter was thereafter annealed at 900° C. for 2 hours with an air-to-fuel ratio A/F=14.3.

Each cycle included a stoichiometric running period of 0~5 sec wherein the engine is set to run with the feed of stoichiometric air-fuel mixture (A/F=14.6) under feedback control so that the inside temperature of the converter was held at about 850° C.

No feedback control was performed in the subsequent period of 5~30 sec in each cycle.

The period of 5~7 sec in each cycle was a fuel excess period wherein the engine was supplied with a fuel-rich mixture (A/F=11.2).

In the period of 7~28 sec in each cycle, the engine continued to be supplied with excess fuel while secondary air is introduced from outside the engine into the catalytic converter through an upstream duct for reacting the excess fuel with the secondary air within the converter (honeycomb support), thereby causing a temperature rise. In this period, the air-fuel ratio of the exhaust gas supplied to the catalytic converter was slightly fuel-lean (A/F=14.8) compared with the stoichiometric state, and the maximum catalyst temperature was about 1,150° C.

In the period of 28~30 sec in each cycle, supply of excess fuel to the engine was stopped while the catalytic converter continued to be supplied with secondary air to realize a lean state of the exhaust gas.

The temperature within the catalytic converter was detected by a thermocouple inserted centrally in the honeycomb support. A phosphorus compound was added to the fuel (gasoline) for causing the catalyst to be poisoned with phosphorus. The amount of phosphorus compound added was such that 816 mg of phosphorus was deposited on the catalyst during the 48 hours of aging.

(Determination of HC-50% Removal Temperature)

For determination of the HC-50% removal temperature, while the engine continued to run with stoichiometric air-fuel mixture, each of the catalytic converters was supplied with exhaust gas with a constant temperature rise of 30° C./min. The exhaust gas was introduced into the catalytic converter at a space velocity (SV) of 90,000/h, and the HC concentration of the exhaust gas was measured after treatment by the converter. The HC-50% removal temperature was the temperature at which 50% of HC was removed from the exhaust gas.

Table 1 shows the results of determination of the HC-50% removal temperature with respect to the catalytic converters according to the embodiments and the comparative example.

The air-fuel mixture supplied to the engine was adjusted to a generally stoichiometric value of A/F=14.6±1.0 under the feedback control.

(Determination of CO-$NO_x$ Cross point removal ratio)

For determination of the cross point removal, the engine was run with an air-fuel mixture which continuously varied from a fuel-rich state to a fuel-lean state, and the resulting exhaust gas was introduced into the catalytic converter. The removal ratios for CO and $NO_x$, respectively, were measured to determine the CO-$NO_x$ cross point removal ratio at which the CO-removal ratio coincided with the $NO_x$-removal ratio.

Table 1 also shows the results of determination of the CO-$NO_x$ cross point removal ratio with respect to the catalytic converters according to the embodiments and the comparative example.

In the CO-$NO_x$ cross point removal ratio determination, the engine was used without stalling on a car, and the exhaust gas was supplied to the catalytic converter at 460° C. with a space velocity SV=90,000/h.

TABLE 1

| Catalyst Composition (Weight Per Liter of Monolithic Support) | | CO—$NO_x$ Cross Point Removal Ratio (%) | HC 50% Removal Temp. (° C.) |
|---|---|---|---|
| 1st Coating Layer (g/l-cat) | 2nd Coating Layer (g/l-cat) | | |
| Embodiment 1 | Pd(1.5)/ Al$_2$O$_3$(70) BaSO$_4$(20) | Pt—Rh(1.0–0.4)/CZY①(90) Al$_2$O$_3$(50) Pt—Rh (0.75–1.0/ZCLN(50) | 97.0 | 330 |
| Embodiment 2 | Pd(1.5)/ Al$_2$O$_3$(50) CZY②(45) BaSO$_4$(20) | Pt—Rh(0.75–0.3)/CZY②(75) Al$_2$O$_3$(55) Pt—Rh(0.75–1.0/ZCL(50) | 96.7 | 345 |
| Embodiment 3 | Pd(1.5)/ Al$_2$O$_3$(50) CZY③(10) BaSO$_4$(20) | Pt—Rh(1.0–0.4)/CZY③(90) Al$_2$O$_3$(40) Pt—Rh(0.75–1.0/ZCP(50) | 98.0 | 340 |
| Embodiment 4 | Pd(1.5)/ Al$_2$O$_3$(50) CZY②(45) BaSO$_4$(20) | Pt—Rh(0.75–0.3)/CZY②(75) Al$_2$O$_3$(55) Pt—Rh(0.75–1.0/ZCL(50) (Surface Support) Pt—Rh(0.5–0.1) | 98.0 | 315 |
| Embodiment 5 | Pd(1.3)/ Al$_2$O$_3$(50) CZY②(45) BaSO$_4$(20) | Pt—Rh(0.9–0.1)/CZY②(75) Al$_2$O$_3$(55) Pt—Rh(0.9–0.3)/ZCLN(50) (Surface Support) Pt(0.2) | 94.0 | 340 |
| Embodiment 6 | Pd(1.0/ Al$_2$O$_3$(40) CZY②(20) BaSO$_4$(20) | Pt—Rh(1.2–0.1)/CZY②(80) Al$_2$O$_3$(60) Pt—Rh(1.0–0.2)/ZCLN(50) (Surface Support) Rh(0.1) | 94.5 | 345 |
| Comparative Example A | Pd(1.5)/ CZ(45) Al$_2$O$_3$(50) BaSO$_4$(20) | Pt—Rh(1.5–1.3)/CZ(75) Al$_2$O$_3$(75) | 82.0 | 375 |

Notes:
CZY①: Ce$_{0.45}$Zr$_{0.48}$Y$_{0.07}$O$_{1.96}$
CZY②: Ce$_{0.5}$Zr$_{0.45}$Y$_{0.05}$O$_{1.97}$
CZY③: Ce$_{0.39}$Zr$_{0.53}$Y$_{0.08}$O$_{1.96}$
ZCLN: Zr$_{0.78}$Ce$_{0.16}$La$_{0.02}$Nd$_{0.04}$O$_{1.97}$
ZCL: Zr$_{0.50}$Ce$_{0.16}$La$_{0.04}$O$_{1.98}$
ZCP: Zr$_{0.64}$Ce$_{0.19}$Pr$_{0.17}$O$_{1.97}$
CZ: Ce$_{0.3}$Zr$_{0.2}$O$_3$ Next, the performance of the catalytic converters (1)–(6) are evaluated by referring to Table 1.

The first coating layer of the catalytic converter (1) according to Embodiment 1 contained the same amount of Pd as that of the catalytic converter (7) according to Comparative Example 1. Pd was supported on Al$_3$O$_3$ in the catalytic converter (1) whereas Pd was supported on CZ in the catalytic converter (7). As a result, the catalytic converter (1) exhibited a lower HC-50% removal temperature and a higher CO-$NO_x$ cross point removal ratio than the catalytic converter (7).

This indicates that Pd, when supported on Al$_2$O$_3$ which is contained in the first coating layer of the catalytic converter, will improve catalytic activity at low temperature to remarkably enhance the exhaust gas cleaning ability.

Like the catalytic converter (1) of Embodiment 1, the first coating layer of the catalytic converter (2) according to Embodiment 2 contained Pd-supporting Al2O$_3$ while also containing CZY② (Ce—Zr complex oxide). Further, the second coating layer of the catalytic converter (2) contained lower contents of Pt and Rh than that of the catalytic converter (1). As a result, the catalytic converter (2) exhibited a lower HC-50% removal temperature than the catalytic converter (1). On the other hand, though the second coating layer of the catalytic converter (2) contained lower contents of Pt and Rh than that of the catalytic converter (1) (decrease of Pt content from 1.75 g to 1.5 g and decrease of Rh content from 1.4 g to 1.3 g), it was substantially equal in CO-$NO_x$ cross point removal ratio to the catalytic converter (1).

This indicates that CZY(2), when contained in the first coating layer of the catalytic converter, will provide a useful degree of CO-$NO_x$ cross point removal ratio even if the contents of Pt and Rh in the second coating layer are reduced.

The first coating layer of the catalytic converter (3) according to Embodiment 3 contained a smaller amount of the Ce—Zr complex oxide than that of the catalytic converter (2) according to Embodiment 2, whereas the second coating layer contained the same amounts of Pt and Rh as that of the catalytic converter (1) As a result, the catalytic converter (3) exhibited a higher CO-$NO_x$ cross point removal ratio than the catalytic converter (1).

The catalytic converter (4) according to Embodiment 4 differs from the catalytic converter (2) according to Embodiment 2 only in that a surface portion of the second coating layer supports Pt and Rh. Thus, the catalytic converter (4) not only exhibited a high CO-$NO_x$ cross point removal ratio but also provided a lowered HC-50% removal temperature to remarkably improve catalytic activity at low temperature.

This indicates that Pt and Rh may be preferably supported on a surface portion of the second coating layer for improving the low temperature catalytic activity of the catalytic converter.

In each of the catalytic converter (5) according to Embodiment 5 and the catalytic converter (6) according to Embodiment 6, a surface portion of the second coating layer supports Pt alone or Rh alone, it yet provides a sufficiently high CO-$NO_x$ cross point removal ratio and a sufficiently low HC-50% removal temperature despite the fact that the total amount of Rh used in the converter as a whole is relatively small.

In summary, a catalytic converter according to the present invention provides the following advantages.

First, in the catalytic converter of the present invention, Pd which is supported on $Al_2O_3$ and is excellent in low temperature activity is contained in the first coating layer which is an inner layer. Thus, the catalytic converter of the present invention is excellent in low temperature activity but yet is less liable to poisoning substances of the exhaust gas which may deteriorate the Pd activity. In the case where the first coating layer of the catalytic converter contains Ba salt of an inorganic acid, the adverse influences of the poisoning substances can be prevented even more effectively.

Secondly, in the catalytic converter of the present invention, the second coating layer which is subjected to high temperature contains Pt and Rh which provide high activity at high temperature, and these metals are supported on a Ce—Zr complex oxide and a Zr—Ce complex oxide which are highly resistant to high temperature while providing an excellent OSC. As a result, the catalytic converter of the present invention provides excellent durability and high exhaust gas cleaning ability at high temperature. In the third place, if Pt and/or Rh are supported on a surface portion of the second coating, the catalytic converter of the present invention provides even higher catalytic activity at low temperature.

What is claimed is:

1. A catalytic converter for cleaning exhaust gas comprising a first coating layer formed on a heat-resistant support, and a second coating layer formed on the first coating layer, wherein the first coating layer contains alumina which supports palladium, the second coating layer contains Ce—Zr complex oxide which coexistently carries platinum and rhodium, and Zr—Ce complex oxide which differs in composition from the Ce—Zr complex oxide and which coexistently carries platinum and rhodium, and the first coating layer additionally contains Ce—Zr complex oxide which does not carry any precious metal.

2. The exhaust gas cleaning catalytic converter according to claim 1, wherein the Ce—Zr complex oxide is represented by the following general formula:

$$Ce_{1-(x+y)}Zr_xM_yO_{2-z} \quad (1)$$

in the formula (1), M represents a rare earth element other than Ce and Zr or an alkaline earth metal, z represents the degree of oxygen deficiency determined by the valence and proportion of the contained element M, $0.25 \leq 1-(x+y) \leq 1.0$, $0 \leq x \leq 0.55$, and $0 \leq y \leq 0.2$; and wherein the Zr—Ce complex oxide is represented by the following general formula:

$$Zr_{1-(a+b)}Ce_aN_bO_{2-c} \quad (2)$$

in the formula (2), N represents a rare earth element other than Ce and Zr or an alkaline earth metal, c represents the degree of oxygen deficiency determined by the valence and proportion of the contained element N, $0.55 \leq 1-(a+b) \leq 1.0$, $0 \leq a \leq 0.45$, and $0 \leq b \leq 0.2$.

3. The exhaust gas cleaning catalytic converter according to claim 1, wherein the second coating layer has a surface layer portion which coexistently carries platinum and rhodium in addition to platinum and rhodium supported on the Ce—Zr complex oxide and the Zr—Ce complex oxide.

4. The exhaust gas cleaning catalytic converter according to claim 1, wherein the second coating layer has a surface layer portion which carries one of platinum and rhodium alone in addition to platinum and rhodium supported on the Ce—Zr complex oxide and the Zr—Ce complex oxide.

5. The exhaust gas cleaning catalytic converter according to claim 1, wherein the first coating layer additionally contains barium salt of an inorganic acid.

6. The exhaust gas cleaning catalytic converter according to claim 1, wherein the first coating layer supports 30~100 g of alumina and 0.5~8.0 g of palladium per liter of the heat-resistant support.

7. The exhaust gas cleaning catalytic converter according to claim 1, wherein the Ce—Zr complex oxide in the second coating layer carries a total amount of 0.3~3.0 g of platinum and rhodium per liter of the heat-resistant support, and the Zr—Ce complex oxide in the second coating layer carries a total amount of 1.0~3.0 g of platinum and rhodium per liter of the heat-resistant support.

8. The exhaust gas cleaning catalytic converter according to claim 3, wherein the surface layer portion of the second coating layer carries a total amount of 0.05~2.0 g of platinum and rhodium per liter of the heat-resistant support.

9. The exhaust gas cleaning catalytic converter according to claim 1, wherein the second coating layer additionally contains alumina which does not support any precious metal.

10. A catalytic converter for cleaning exhaust gas comprising a first coating layer formed on a heat-resistant support, and a second coating layer formed on the first coating layer, wherein the first coating layer contains alumina which supports palladium, the second coating layer contains Ce—Zr complex oxide which coexistently carries platinum and rhodium, and Zr—Ce complex oxide which differs in composition from the Ce—Zr complex oxide and which coexistently carries platinum and rhodium, and the second coating layer additionally contains alumina which does not support any precious metal.

* * * * *